(12) United States Patent
Jenniges et al.

(10) Patent No.: US 7,249,051 B1
(45) Date of Patent: Jul. 24, 2007

(54) COMPUTERIZED INCENTIVE SYSTEM

(75) Inventors: Joseph C. Jenniges, Eden Prairie, MN (US); John M. Jack, Wayzata, MN (US); Stephanie Binzen, Minnetonka, MN (US)

(73) Assignee: BI Performance Services, Minneapolis, MN (US)

( * ) Notice: Subject to any disclaimer, the term of this patent is extended or adjusted under 35 U.S.C. 154(b) by 0 days.

(21) Appl. No.: 09/376,811

(22) Filed: Aug. 18, 1999

(51) Int. Cl.
*G07G 1/14* (2006.01)

(52) U.S. Cl. .............................. 705/14; 705/7; 705/11

(58) Field of Classification Search .................. 705/11, 705/7, 14
See application file for complete search history.

(56) References Cited

U.S. PATENT DOCUMENTS 6,120,300 A * 9/2000 Ho et al. ..................... 434/332

FOREIGN PATENT DOCUMENTS

JP         411257986 A *   9/1999

OTHER PUBLICATIONS

Noori and Radford, Production and Operations Management, Total Quality and Responsiveness, McGraw-Hill, Inc., Internation Edition, pp. 312-314.*
Appelbaum, Steven; Self-effiacy as a mediator of goal setting and performance Some human resouce applications; Journal of Managerial Psychology; v11n3; 14 pages; 1996.*
Pizza Hut Star Tracks Rewards & Recognition Program for RGMs and Restaurant Team (1998).
Mitsubishi Motors "In Your Care Working Together to Win" (1996).
Acura Precision Team "For Those Who are Committed to Reaching New Heights" (1998).
Schreiber Food "Cheese Wheel of Fortune" (1989).
Luzi, Al, "Broker Incentive Recommendations for Sunshine Biscuits, Inc." (1995).
Mitsubishi Motor Sales of America, Inc. "Perfect Delivery Partners" (1995).
Transamerica Insurance Finance "Africa A.Self Portrait" (1993).
Transamerica Insurance Finance "which way to the Awards" (1997).
Chevrolet GEO "On the Move—The Driving Momentum of Chevrolet" (1994).
Canon Copiers "Operation Knockout" (1998).
"Frequent Stay Programs" *Travel Weekly* (1990).
Consumers Earn Free Toys and Clothes With New Credit Card from TOYS "R" US *HighBeam Research, PR Newswire*, Sep. 14, 1995 http://www.highbeam.com/library/doc3.asp?DOCID=1G1:17420469&ctrlInfo=Round 20%.
Noori &Radford, "Production and Operations Management, Total Quality and Responsiveness," McGraw-Hill, Inc., International Edition, pp. 312-314.

(Continued)

*Primary Examiner*—Elaine Gort
(74) *Attorney, Agent, or Firm*—Moss & Barnett, P.A.

(57) ABSTRACT

The motivation of a participant in an incentive program is enhanced by enabling the participant to set goals, report performance related to the goals, and receive feedback on the achievement of the goals. The feedback includes report(s) and/or reward(s). Motivation is further enhanced by heuristically and dynamically adapting the goals according to performance.

20 Claims, 9 Drawing Sheets

OTHER PUBLICATIONS

Appelbaum &.Hare, "Self-Efficacy as a Mediator of Goal Setting and Performance: Some Human Resource Applications," *Journal of Managerial Psychology* (vol. 11, No. 3), 33 (1996).

Locke, E.A., "Motivation Through Conscious Goal Setting," *Applied and Preventive Psychology* (vol. 5), 117-24 (1996).

Latham & Locke, "Self-Regulation Through Goal Setting," *Organizational Behavior & Human Decision Processes* (vol. 50, No. 2) 212-48 (Dec. 1991).

Klein, H.J., "Further Evidence on the Relationship Between Goal Setting and Expectancy Theories," *Organizational Bahavior & Human Decision Processes* (vol. 49, No. 2) 230-58 (Aug. 1991).

Locke & Latham "A Theory of Goal Setting and Task Performance" (Prentice Hall, Engelwood Cliffs, N.J. (1990).

Wright, P.M., "A Test of the Mediating Role of Goals in the Incentive-Performance Relationship," *Journal of Applied Psychology* (vol. 74, No. 5) 699-706 (Oct. 1989).

Reidel, Nebeker & Cooper, "The Influence of Monetary Incentives on Goal Choice, Goal Commitment, and Task Performance," *Organizational Behavior & Human Decision Processes* (vol. 42, No. 2) 155-81 (Oct. 1988).

\* cited by examiner

US 7,249,051 B1

COMPUTERIZED INCENTIVE SYSTEM

FIELD OF THE INVENTION

The present invention relates generally to a computerized incentive program, and more particularly to a system for stimulating and evaluating performance according to predetermined goals.

COPYRIGHT NOTICE/PERMISSION

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever. The following notice applies to the software and data as described below and in the drawings hereto: Copyright © 1999, BI® Performance Services™, BI® is a tradename of Schoeneckers, Inc. All Rights Reserved.

BACKGROUND OF THE INVENTION

Incentive programs are typically offered by sponsoring organizations to promote the sales of their products or services, or to improve another measure of performance of participating employees and independent contractors of the sponsor. Incentive programs are also known as "promotions." Participants in incentive programs may be a natural person, an animal, or an organization. Participants can receive credits that are accumulated and exchanged for services, such as travel, merchandise, or numismatic funds. Gaining and maintaining the motivation to achieve the rewards can be difficult for the participant. However, it has become well-known and publicized by personal-improvement experts such as Zig Ziglar and Tony Robbins, by various twelve-step behavior modification programs such as the program sponsored by Alcoholic Anonymous Association, and through over five-hundred studies of the effects of goal-setting on work tasks, such as "Motivation Through Conscious Goal Setting, Applied and Preventive Psychology," Locke, E. A., 1996, "Self-Regulation Through Goal Setting," Academic Press, Latham, G. P. & Locke, E. A., 1991, "Further Evidence on the Relationship Between Goal Setting and Expectancy Theories, Organizing Behavior and Human Decision Process," Klein, H. J., 1991, "A Theory of Goal Setting and Task Performance, Prentice Hall," Locke, E. & Latham, G., 1990, "A Test of the Mediating Role of Goals in the Incentive-Performance Relationship, Journal of Applied Psychology," Wright, P. M., 1989 and "The Influence of Monetary Incentives on Goal Choice, Goal Commitment and Task Performance, Organizational Behavior and Human Processes," Reidel, J. A., Nebeker, D. M. & Cooper, B. L., 1988.

A participant who has self-selected a goal is more likely to gain and maintain the necessary motivation to achieve that goal than a participant who has no goal, or a goal that is not self-selected. Perhaps the most common use of goal-setting in business is in the establishment of quotas, incentive plans and bonus qualifiers. In general, such goals are established unilaterally by management, and because the process is top-down, with little or no opportunity for negotiation, the goals are sometimes rejected or ignored, and thus have little or no impact on performance.

Recording self-selected performance goals and recording the actual performance, and then comparing the actual performance to the goals and issuing rewards when goals are met, requires extensive resources. In particular, for organizations that wish to compensate numerous employees, vendors and independent contractors for their performance related to the organization, the resources needed for this highly specialized function are particularly expensive to acquire and reliably maintain. Furthermore, it has been observed that a participant's motivation will diminish over time when the same goals are repeatedly presented to the participant.

There is a need, therefore, for a computerized incentive system that overcomes all the above-described disadvantages. More specifically, there is a need for a computerized incentive system that records self-selected goals and performance of participants, compares the performance to the goals, assigns rewards to the participants pursuant to the comparison and heuristically adjusts the rewards threshold based on the prior history of achievement and performance of the participant.

SUMMARY OF THE INVENTION

The above-mentioned shortcomings, disadvantages and problems are addressed by the present invention, which will be understood by reading and studying the following specification.

Incentive is provided by storing goal data of a participant that includes at least one minimum threshold level of performance, storing historical performance data of the participant, comparing the historical performance data to the predetermined goal data, generating a result indicating the extent to which historical performance data satisfies the goal criteria, transmitting the result of the comparison to at least one destination, and delivering the result to the participant. In another embodiment, a participant's ability to achieve the goal(s) is enhanced when the threshold of rewards is heuristically adjusted based on past performance.

The apparatus includes a storage system for storing predetermined goal data of a participant and for storing performance data of a participant, a comparator component operatively coupled to the storage system for comparing the performance data to the predetermined goal data to determine if the performance data satisfies the pre-determined goal data and a transmitter operatively coupled to the comparator for transmitting the result of the comparison to a destination output device.

The present invention describes systems, clients, servers, methods, and computer-readable media of varying scope. In addition to the aspects and advantages of the present invention described in this summary, further aspects and advantages of the invention will become apparent by reference to the drawings and by reading the detailed description that follows.

DETAILED DESCRIPTION OF THE INVENTION

Figure 1:
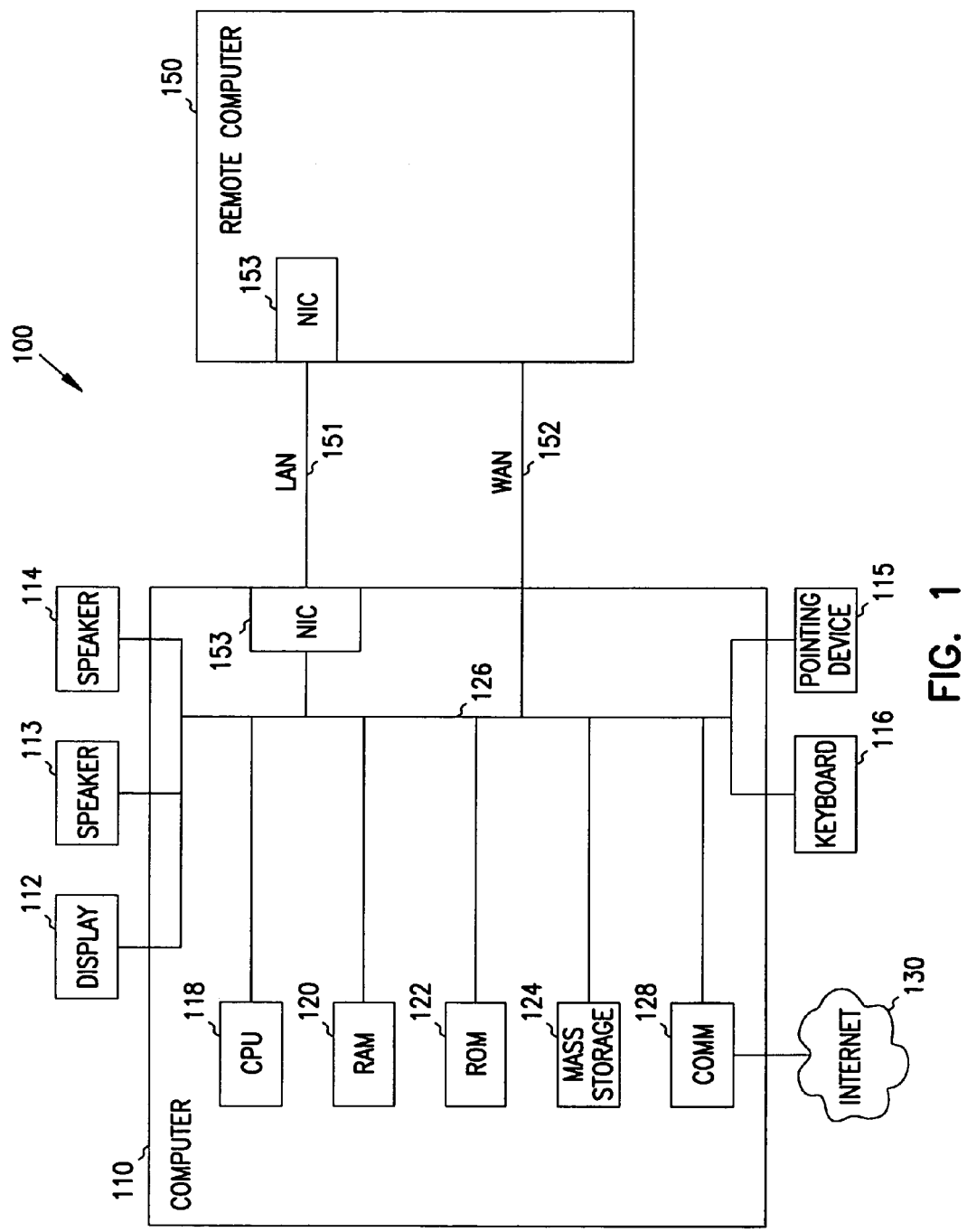
FIG. 1 is a block diagram of the hardware and operating environment in which different embodiments of the invention can be practiced.

In the following detailed description of exemplary embodiments of the invention, reference is made to the accompanying drawings which form a part hereof, and in which is shown by way of illustration specific exemplary embodiments in which the invention may be practiced. These embodiments are described in sufficient detail to enable those skilled in the art to practice the invention, and it is to be understood that other embodiments may be utilized and that logical, mechanical, electrical and other changes may be made without departing from the scope of the present invention. The following detailed description is, therefore, not to be taken in a limiting sense, and the scope of the present invention is defined only by the appended claims.

The detailed description is divided into six sections. In the first section, the hardware and the operating environment in conjunction with which embodiments of the invention may be practiced are described. In the second section, a system level overview of the invention is presented. In the third section, promotion rules are described. In the fourth section, methods for an exemplary embodiment of the invention are provided. In the fifth section, a particular relational database management system (RDBMS) implementation of the invention is described. Finally, in the sixth section, a conclusion of the detailed description is provided.

A campaign consists of solicitation of a participant, response from the participant, and measurement of the response. A promotion or incentive program serves as the mechanism to capture responses to a solicitation, in which the promotion is used to issue rewards in order to provide a bonus-level benefit so that participant's responses are calculated and campaign effectiveness is measured. Rewards are also referred to as awards by those skilled in the art. A participant is a consumer, employee or secondary sponsor who has either actively or passively enrolled in a sponsor's incentive program. Participants accumulate activity, receive incentive program communications and earn rewards based on point accumulations or relationships valued by the sponsor. An incentive program rewards participants based on qualifying data. A tier is a classification of a participant based on the participant's earned value to the incentive program. Tier classes are associated with rewards. A reward is any one of the following: a communications, such as a letter, card, a verbal congratulation, numismatic finds, merchandise, certificates or a tier promotion (operational upgrades). A segment is a classification of participants based on at least one of a number of qualities, such as geographic location, territory, potential marketing value, job classification code, or participant type; which can be carried with each participant and set up dynamically to match sponsor values and descriptions.

Data relating to the participant, the participant's activities and/or customer contacts logged with the participant will determine whether or not the participant qualifies for a promotion. Generally, a promotion is setup by management personnel of the sponsor using selections of data and time parameters. Qualification for a promotion will reward the participant with points, such as AwardperQs® or Mileage Money™, merchandise, communications, etc. Awarding of points can be accomplished through a promotion, bonus or spurt or spiff points. Spurts or spiffs reward a participant with bonus points for specified performance during a defined period of time.

Hardware and Operating Environment

FIG. 1 is a block diagram of the hardware and operating environment 100 in which different embodiments of the invention can be practiced. The description of FIG. 1 provides an overview of a conventional computer hardware and a suitable computing environment in conjunction with which the invention can be implemented. The invention is described in terms of a computer executing computer-executable instructions. However, the invention can be embodied entirely in computer hardware in which the computer-executable instructions are implemented in read-only memory. The invention can also be implemented in client/server computing environments where remote devices that are linked through a communications network perform tasks. Program modules can be located in both local and remote memory storage devices in a distributed computing environment.

Computer 110 is operatively coupled to display device 112, pointing device 115, and keyboard 116. Computer 110 includes a processor 118 (e.g. an Intel Pentium processor), random-access memory 120 (RAM), read-only memory 122 (ROM), and one or more mass storage devices 124, and a system bus 126, that operatively couples various system components including the system memory to the processing unit 118. Mass storage devices are more specifically types of nonvolatile storage media and can include a hard disk drive, a floppy disk drive, an optical disk drive, and a tape cartridge drive. The memory 120, 122, and mass storage devices, 124, are types of computer-readable media. A user can enter commands and information into the personal computer 110 through input devices such as a pointing device 115 and a keyboard 116. Other input devices (not shown) can include a microphone, joystick, game pad, satellite dish, scanner, or the like. The processor 118 executes computer programs stored on the computer-readable media. The invention is not limited to any type of computer 110. Computer 110 can be a PC-compatible computer, a MacOS-compatible computer or a UNIX-compatible computer. The construction and operation of such computers are well known within the art.

Furthermore, computer 110 can be communicatively connected to the Internet via a communication device 128. Internet 130 connectivity is well known within the art. In one embodiment, the computer includes a communication device that is a modem and corresponding communication drivers to connect to the Internet via what is known in the art as a "dial-up connection." In another embodiment, the computer includes a communication device that is an Ethernet or similar hardware (network) card connected to a local-area network (LAN) that itself is connected to the Internet via what is know in the art as a "direct connection" (e.g., T1 line, etc.).

Computer 110 also has at least one operating environment running thereon, each desirably providing a graphical user interface including a user-controllable pointer. Such operating environments include operating systems such as versions of the Microsoft Windows and Apple MacOS operating systems well-known in the art. The invention is not limited to any particular operating environment, however, and the construction and use of such operating environments are well known within the art. Computer 110 also desirably can have at least one web browser application program running within at least one operating environment, to permit users of computer 110 to access intranet or Internet world-wide-web pages as addressed by Universal Resource Locator (URL) addresses. Such browser application programs include Netscape Navigator and Microsoft Internet Explorer.

Display device 112 permits the display of information, including computer, video and other information, for viewing by a user of the computer. The invention is not limited to any particular display device 112. Such display devices include cathode ray tube (CRT) displays (monitors), as well as flat panel displays such as liquid crystal displays (LCD's). Display device is connected to the system bus 126. In addition to the monitor, computers typically include other peripheral output devices such as printers (not shown), speakers, pointing devices and a keyboard. Speakers 113 and 114 enable the audio output of signals. Speakers 113 and 114 are also connected to the system bus 126. Pointing device 115 permits the control of the screen pointer provided by the graphical user interface (GUI) of operating systems such as versions of Microsoft Windows. The invention is not limited to any particular pointing device 115. Such pointing devices include mouses, touch pads, trackballs, remote controls and point sticks. Finally, keyboard 116 permits entry of textual information into computer 110, as known within the art, and the invention is not limited to any particular type of keyboard.

The computer 110 can operate in a networked environment using logical connections to one or more remote computers, such as remote computer 150. These logical connections are achieved by a communication device coupled to or a part of the computer 110; the invention is not limited to a particular type of communications device. The remote computer 150 can be another computer 110, a server, a router, a network PC, a client, a peer device or other common network node. The logical connections depicted in FIG. 1 include a local-area network (LAN) 151 and a wide-area network (WAN) 152. Such networking environments are commonplace in offices, enterprise-wide computer networks, intranets and the Internet.

When used in a LAN-networking environment, the computer 110 and remote computer 150 are connected to the local network 151 through a network interface or adapter 153, which is one type of communications device. When used in a conventional WAN-networking environment, the computer 110 and remote computer 150 communicate with a WAN 152 through modems (not shown). The modem, which can be internal or external, is connected to the system bus 126. In a networked environment, program modules depicted relative to the personal computer 110, or portions thereof, can be stored in the remote memory storage device.

System Level Overview

A system level overview of the operation of an exemplary embodiment of the invention is described by reference to FIG. 2. The concepts of the invention are described as operating in a multi-processing, multi-threaded operating environment on a computer, such as computer 110 in FIG. 1. The incentive system includes the incentive engine 210, goal data 220, performance data 230 and a result 240. The incentive engine 210 receives goal data 220 and performance data 230, compares the goal data 220 to the performance data 230, and generates a result 240 that is transmitted to a receiving medium. The goal data 220 describes the rewards threshold.

More specifically, goal data 220 describes one or more levels of performance required to be achieved by a participant in the incentive system 200 in order to receive perquisite rewards. A perquisite reward is a privilege, gain, or profit incidental to regular salary or wages. Goal data 220 includes self-selected goals entered by the participants, based on the specific rules of the incentive program. Rules are based on sales, productivity, cost savings or other type of performance desired by a program sponsor.

The performance data 230 describes the actual performance achieved by the participant. In one embodiment, performance data 230 is defined in terms of individual actions that represent a participant's interaction with a sponsor or with an agent of a sponsor, in which transactions are used in the incentive program to stimulate the qualification for promotions and record reward results.

The system level overview of the operation of an exemplary embodiment of the invention has been described in this section of the detailed description. While the invention is not limited to any particular incentive program, for sake of clarity a simplified incentive program has been described.

Promotion Rules

An incentive program is a set of promotion rules, business rules, or goal data, that are applied to a participant's performance data to determine qualification for a reward.

In one embodiment, an incentive program coexists with another promotion in which the rules of the promotion permit qualification in other promotions that are defined with overlapping time periods. In another embodiment, an incentive program exists mutually exclusive of other promotions. Promotions that are designated as exclusive will contain an indicator of priority in relation to other promotions.

In one embodiment, the promotion rules indicate that rewards are issued at, or no earlier than a specific date. In another embodiment, the promotion rules indicate that rewards are issued immediately after the incentive system identifies the reward qualification. In another embodiment, the promotion rules indicate that a participant is qualified for a reward upon enrollment in the promotion.

Furthermore, in one embodiment, the promotion rules indicate that a promotion is a base promotion or a supplemental promotion.

For base promotions, a reward is identified for every qualifying occurrence of an associated sales result, performance event or transaction, in which base currency is rewarded and associated directly with the individual transaction that completed the qualification. For example, a participant will receive one point for every dollar of value generated by the transaction. In base promotions, a reward can be earned multiple times within the effective time period of the promotion. In contrast, in supplemental promotions, the promotion rules require the presence of one or more qualifying transactions to complete the qualification for a reward. Therefore, the rewards may not be attributed to a single transaction. Similarly, the promotion can only be rewarded once to any participant. For example, to qualify for a reward, three sales transactions for a participant within a specified month will qualify for the issue of bonus currency.

The reward can be earned only once, and is associated with the presence of at least one transaction. In the instance of exclusive promotions, the highest qualifying priority will be rewarded. In other words, if the sales results or performance data indicate that a participant is qualified for a reward under the promotion rules of a number of exclusive promotions, only one reward will be made, which will be for the highest level reward that the performance is qualified for.

A participant is qualified for a reward in one of three ways: In one embodiment, a qualification is triggered from a single posting of activity in which the participant is qualified for a promotion based on the receipt and posting of a single transaction comprised of qualifying data. Furthermore, the transaction may be identified based on combinations of one of more activity-related data values that include activity type, source, date/time of the activity, and minimum threshold amount. Minimum thresholds are based on summary transaction values for qualifying transactions as they relate to quantity and/or revenue. Different segments of a participant base may have different goal level criteria. In another embodiment, qualification for a reward is triggered by consecutive postings of activity in which a participant is qualified for a promotion based on the receipt and posting of a given number of consecutive transactions, each comprised of qualifying data. Furthermore, transactions are identified based on combinations of one or more activity-related data values that include activity type, source, date/time of the activity, and threshold amount. In yet another embodiment, qualification for a reward is triggered by multiple postings of activity using different promotion rules for each activity in which a participant is qualified for a promotion based on the receipt and posting of a given number of transactions where each transaction may be comprised of different qualifying data. For example, within a given period, activity transactions posted for a participant using three distinct products will result in qualification.

METHODS OF AN EXEMPLARY EMBODIMENT OF THE INVENTION

In the previous section, a system level overview of the operation of an exemplary embodiment of the invention was described. In this section, the particular methods performed by the server and the clients of such an exemplary embodiment are described by reference to a series of flowcharts. The methods performed by the clients and servers constitute computer programs made up of computer-executable instructions. Describing the methods by reference to a flowchart enables one skilled in the art to develop such programs including such instructions to carry out the methods on suitable computerized clients and servers (the processor of the clients and servers executing the instructions from computer-readable media). Similarly, the methods performed by the server constitute computer programs also made up of computer-executable instructions. Describing the methods by reference to flowcharts enables one skilled in the art to develop programs including instructions to carry out the methods on a suitable computerized server (the processor of the clients executing the instructions from computer-readable media).

Figure 3:
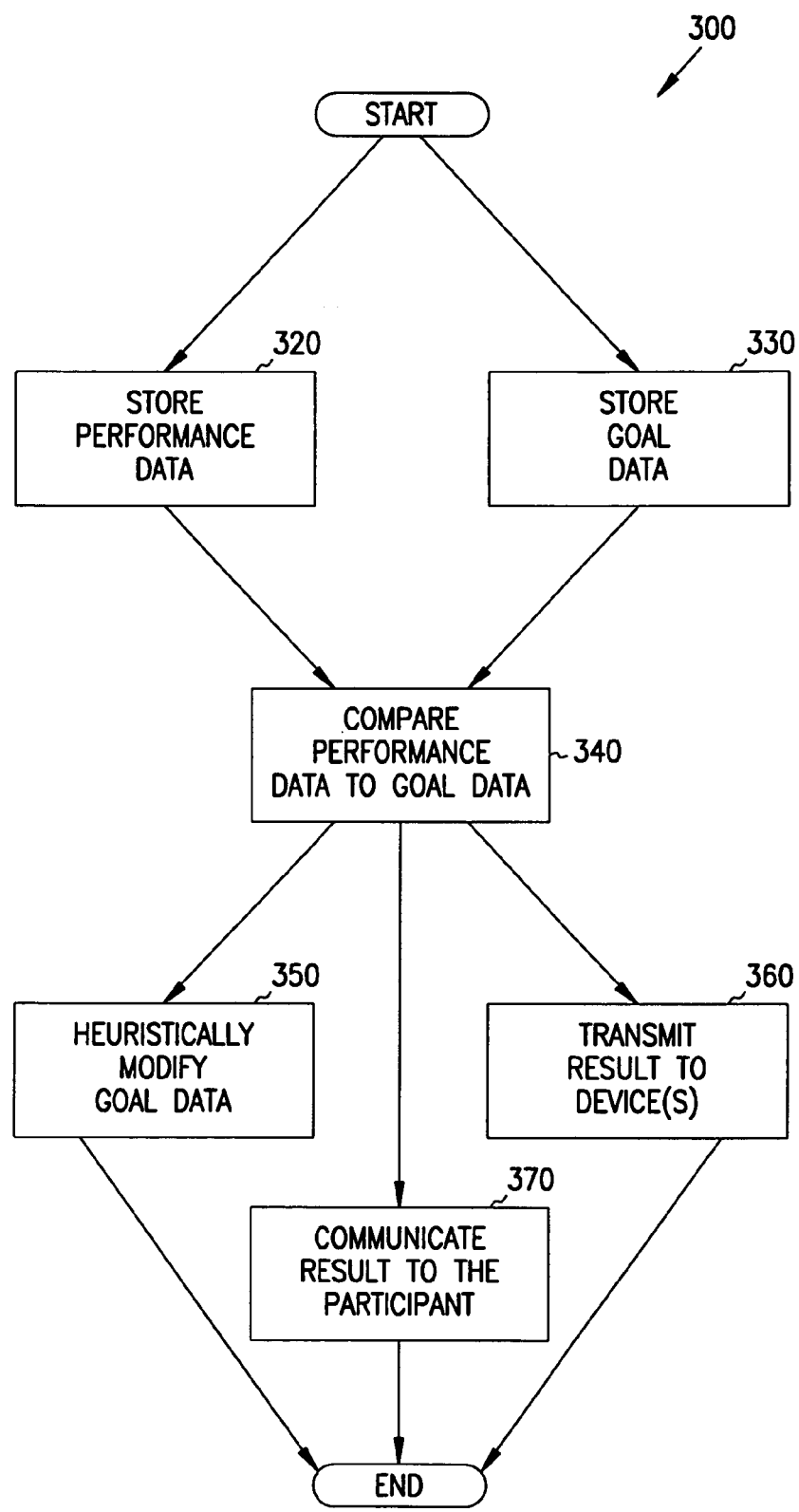
FIG. 3 is a flowchart of a method performed by a computer according to an exemplary embodiment of the invention.

Referring first to FIG. 3, a flowchart of a method performed by a client according to an exemplary embodiment of the invention is shown. This method is inclusive of the acts required by the computerized incentive system.

Method 300 begins with either storing performance data of a participant (block 320) or storing goal data of a participant (block 330). There is no required order for the start of completion of either storing performance data of a participant (block 320) or storing goal data of a participant (block 330). Either action can begin before the other action, and end before the other action. Moreover, both can be performed simultaneously.

The goal data in varying embodiments can include at least one measurement of a minimum threshold level of performance that the participant is desired to achieve. The goal data is determined before the performance occurs in order to set a benchmark for the performance. This predetermined goal data includes one or more goal levels that is determined by the program sponsor. The goal level that is desired to be achieved is determined by the program participant, which is referred to as self-selected goals by those skilled in the art, or by the program sponsor. Alternatively, the goal level that is desired to be achieved is determined by the program sponsor. In one alternative, the goal data is one or more measures of sales by the participant, alternatively, the goal data is one or more measures of safety compliance of the participant, and in another alternative, the goal data is one or more measures of efficiency of the participant. In yet another alternative, the goal data describes performance goals for an individual participant, and in another alternative, the goal data describes performance goals for aggregate classes of participants. In still another alternative, the goal data includes measures of time. In yet still another alternative the goal data indicates at least one perquisite reward corresponding to one or more performance goals of the participant. In other embodiments, the goal data indicates levels of training, cost-savings, the number of displays installed, or the number of demonstrations given. The goal data can be generated by the participant, the participant's sponsor, or in combination of either. The performance data is one or more measures of past performance related to the goal data. Performance data is also known as transaction data. The elements of performance data include activity type, revenue, quantity, source, and time/date. In one embodiment, performance data is validated for no duplication with other performance data and validated for integrity in regards to the source and audits. Validation for integrity is a verification that all anticipated data has been received. A participant can be either an animal, such as an individual person, or an organization.

After storing performance data of a participant (block 320) and storing goal data of a participant (block 330) have both been completed, the goals are heuristically modified based on the historical performance data of the participant. More specifically, the goal data (220 in FIG. 2) is dynamically adapted, extended and enhanced according to the past performance data (230 in FIG. 2) or the participant in order to enhance the effect of the incentive on a participant In one embodiment, the heuristic modification/adaptation of the goals includes modifying a minimum threshold level of performance that the participant is required to achieve for a particular reward.

After storing of performance data of a participant (block 320) and storing of goal data of a participant (block 330) are completed, goal data and performance data are compared to determine to what extent, if any, the historical performance meets the performance goals (block 340). In one embodiment, the comparison (block 340) is a quantitative comparison of the historical performance data to the performance goals to determine if the performance data satisfies a minimum threshold of the goal. In another embodiment, the comparison (block 340) is a qualitative comparison of the historical performance data to the performance goals. In yet another embodiment, satisfactory performance is tallied in terms of points, which are used to determine rewards.

Thereafter, four operations take place in any order: the goal data is heuristically modified (block 350) based on the performance data and/or the result of the comparison (block 340); the result of the comparison (block 340) is transmitted to at least one receiving device (block 360); the result of the comparison (block 340) is communicated to the participant (block 370), and a reward is issued to the participant (not shown), ending the method.

Figure 4:
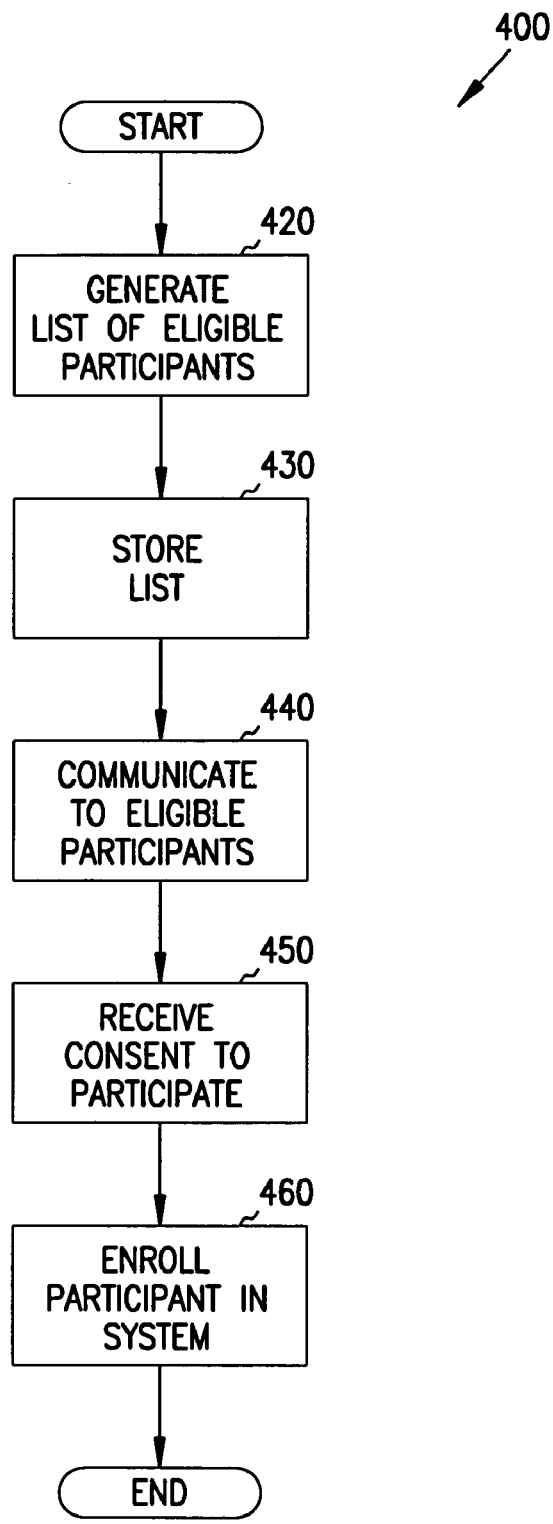
FIG. 4 is a flowchart of a method performed by a computer according to an exemplary embodiment of the invention.

FIG. 4 illustrates an alternative embodiment in which method 400 determines the actual participants from a list of eligible participants. Method 400 is performed by a client 150 program executing on a computer, such as computer 110 in FIG. 1, and is inclusive of the acts required by the computerized incentive system. In one embodiment, method 400 starts before the storing of performance data (block 320) in FIG. 3. First, a list of eligible participants is generated (block 420). In one embodiment, the list is generated by a sponsoring organization that has employees, vendors and independent contractors that the sponsoring organization desires to increase performance thereof. For example, a sponsoring organization such as a travel agency, has a mix of employees and independently affiliated travel agents that the travel agency desires to close more sales of vacation packages. Therefore, the travel agency will create a list of the employees and independent agents that it desires to be eligible for incentive (block 420). The list is stored (block 430), and participation of the eligible participant will be solicited by communicating the eligibility of the eligible participant to the eligible participant (block 440) along with a request to participate. Later, consent to participate by the eligible participants will be received (block 450), or in the alternative, the method will terminate for that eligible participant. In another embodiment, the consent will be first communicated by the participant to the sponsor, and then consent will be received from the sponsor. Upon receipt of acknowledgment of a participant, the eligible participant will be enrolled (block 460). In another embodiment, goal data is received from the participant or from a sponsor data of the participant before enrollment of the participant, during enrollment or after enrollment (block 460). In another embodiment, in addition to consent, information on the participant, such as the identification of the participant's sponsor, active/inactive status, identification, address, and phone number (not shown) will be recorded during enrollment (block 460); the identification designated by the participant and including any one or more of social security number, employee ID, card number, etc., the address including any one or more of resident address, billing address, and ship-to address, one of which is designated as a primary address; and the phone number including any one of residence phone number, business phone number and a mobile phone number, one of which is designated as a primary phone number. Thereafter, method 400 ends and subsequently, method 300 begins 310 in FIG. 3.

Figure 5:
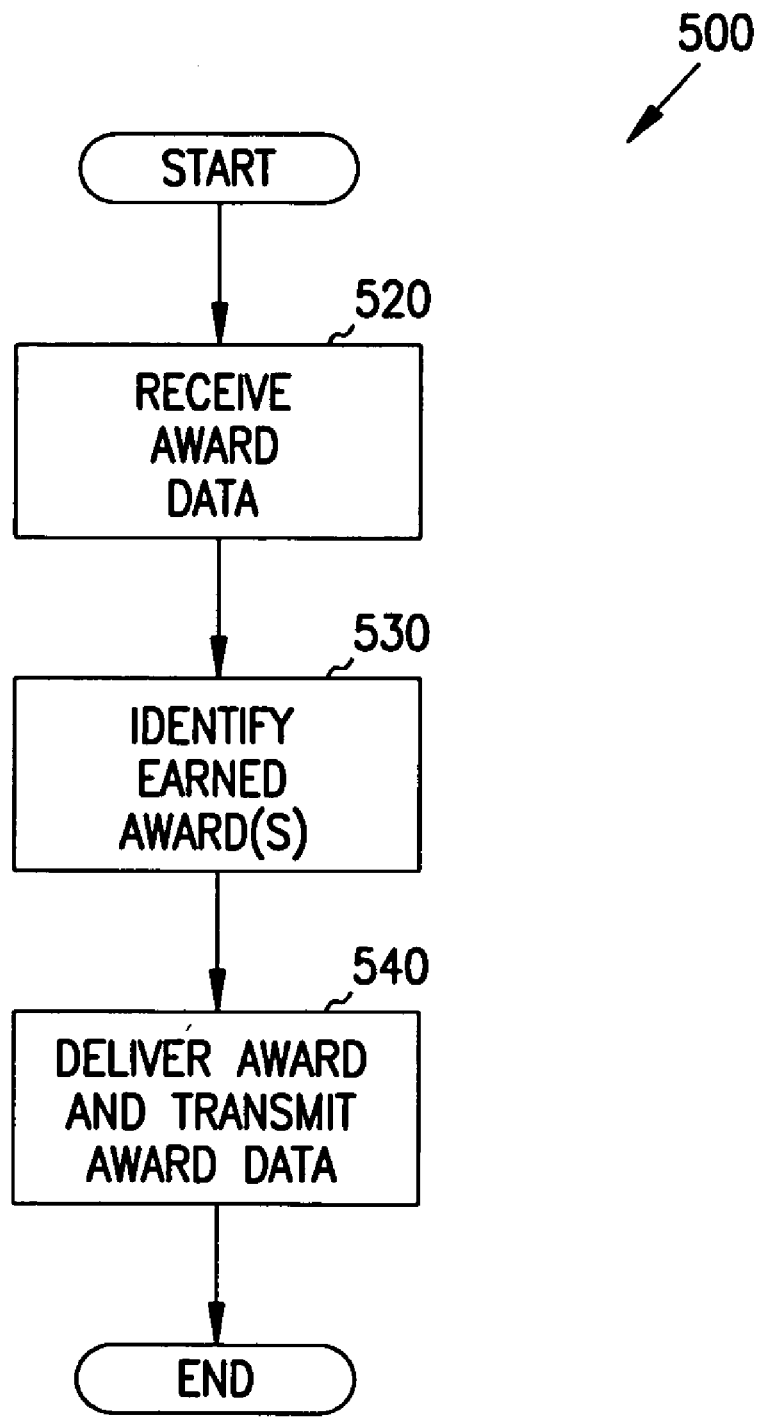
FIG. 5 is a flowchart of a method performed by a computer according to an exemplary embodiment of the invention.

FIG. 5 illustrates an alternative embodiment in which method 500 determines the actual participants from a list of eligible participants. Method 500 is performed by a client 150 program executing on a computer, such as computer 110 in FIG. 1, and is inclusive of the acts required by the computerized incentive system. Method 500 starts by receiving perquisite reward data that corresponds to the goals of a participant (block 520) and stored in a manner that associates the reward data with the participant. The reward data indicates a reward and the performance required for the reward. In one embodiment, the reward data is associated with an individual participant. In another embodiment, the reward data is associated with a particular class of participants, such as all participants associated with a sponsor, or a subset of the participants associated with a sponsor. Thereafter, the reward(s) that a participant has earned is identified or determined (block 530) by comparing the performance level of the participant to the required level of performance. Subsequently, the reward is delivered to the participant (block 540) and the method ends.

Figure 6:
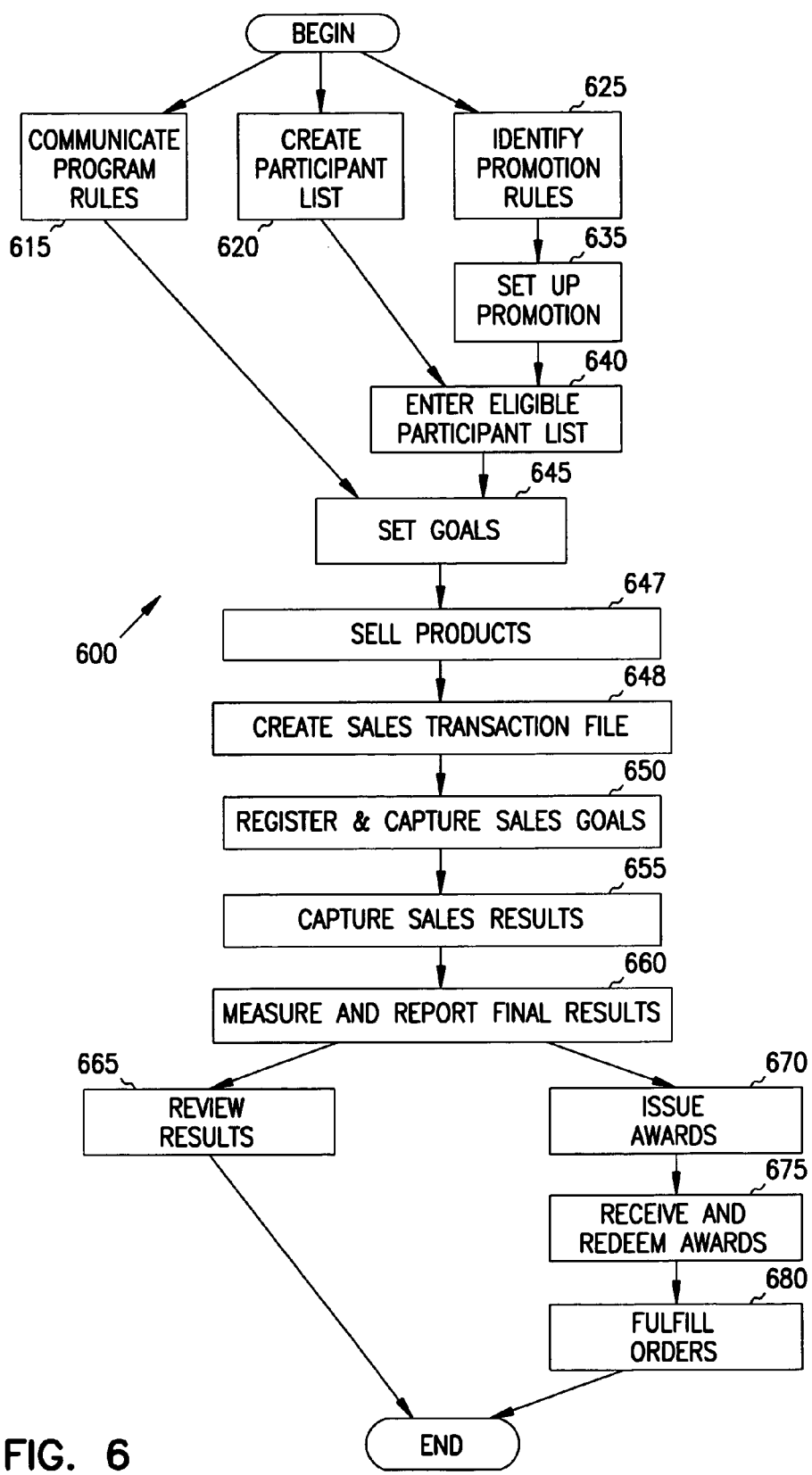
FIG. 6 is a flowchart of a method performed by a computer according to an exemplary embodiment of the invention.

FIG. 6 illustrates an alternative embodiment. Method 600 is performed by a client 150 program executing on a computer, such as computer 110 in FIG. 1, and is inclusive of the acts required by the computerized incentive system. Method 600 starts and thereafter, the rules of the incentive program promotion as described above are identified (block 625).

Thereafter, the promotion is initiated (block 635) by storing the promotion rules. The participant list is created (block 620). Participants may be identified as members of a group such as a household by linking the members to form a participating group In addition, participants can be identified as active or inactive. After the participant list is created (block 620) and after the incentive promotion is setup (block 635), the list of eligible participants is recorded (block 640). The rules of the program are communicated to the participants (block 615) in a manner well-known to those skilled in the art, such as through the mail, email, or a direct phone call from a customer service representative, and after the list of eligible participants is entered (block 640), the goals of the participants (block 645) are determined. Thereafter, the incentive program products are sold (block 647), and thereafter, a file of sales transactions is created (block 648). After a file of sales transactions is created (block 648) and the goals of the participants are determined (block 645), the sales goals are registered and captured (block 650). Registering goals is the act of self-selecting goals by the participants and occurs prior to the sales activity. Goals can include retroactive activity. Capturing goals is receiving and recording the goals. All of the above actions must be completed before continuing. Subsequently, sales results and performance is captured and recorded (block 655), and the sales are measured and the results are formatted into a report (block 660).

Thereafter, the sales results (performance data) of a participant associated with a coexistent promotion is analyzed for qualification in multiple time-wise coexistent promotions.

Thereafter, the results report can be viewed by the participant and/or the sponsor of the participant (block 665) and thereafter the method 600 ends.

Rewards are issued to the participants (block 670), the participants will receive reward certificates or promotion currency and can redeem the certificates or currency (block 675), and orders for the rewards will be fulfilled (block 680) and the method 600 ends. In one embodiment, participants request redemption of certificate or currency via any one of a number of methods well-known to those skilled in the art, such as fax, email, phone, or through a request captured by a computer.

In an alternative (not shown) to actions 670, 675, and 680, the reward will be determined and delivered to the participant.

The particular methods performed by the computerized incentive system of an exemplary embodiment of the invention have been described.

Implementation

Figure 2:
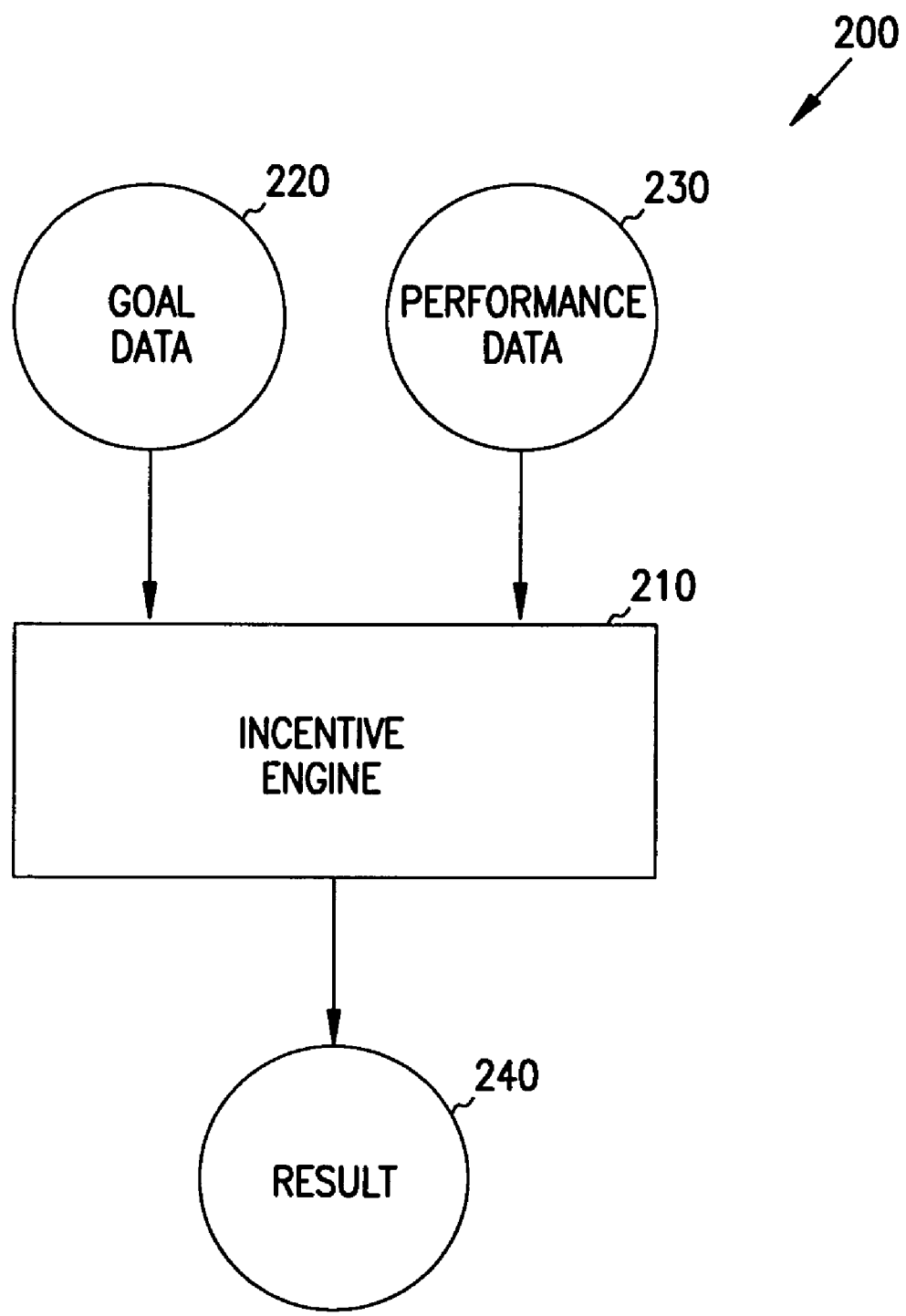
FIG. 2 is a diagram illustrating a system-level overview of an exemplary embodiment of the invention.
Figure 7:
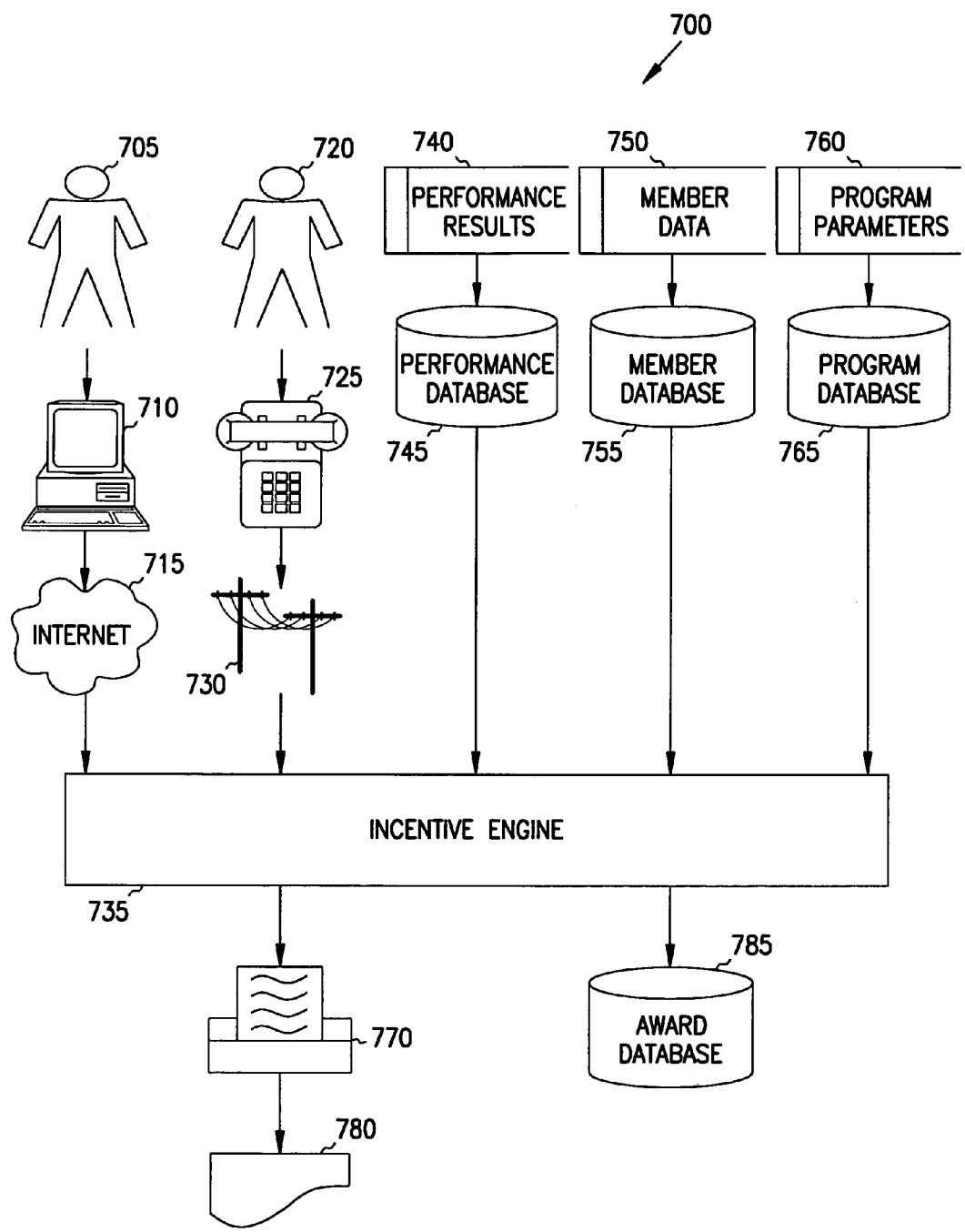
FIG. 7 is a block diagram of an apparatus according to an exemplary embodiment of the invention.

Turning now to FIG. 7, the diagram illustrates a particular implementation 700 of the system described in conjunction with FIG. 2 and the methods described in conjunction with FIGS. 3, 4, 5 and 6.

Apparatus 700 includes an interface providing a mechanism to enter and maintain promotion rules, participant identification, goals and performance through a keyboard display interface running on a computer 710 such as computer 110 in FIG. 1 or remote computer 150 in FIG. 1. Examples of interfaces are a software program with a graphical user interface, and an Internet 715 based interface. In another embodiment, an operator 720 will use a telephone 725 to enter data through and an audio interactive voice-response interface (not shown) over the plain old telephone systems (POTS) 730. In another embodiment (not shown), the data is received via a physical recording medium well-known to those skilled in the art, such as magnetic tape or CD-ROM. The data is entered into the incentive engine 735 where the data is stored and analyzed. Furthermore, apparatus 700 includes records of performance results of the participants 740 that are transmitted for storage in the performance database 745, which in one embodiment is an SQL relational database management system (RDBMS) manufactured by Oracle Corp. and is well-known to those skilled in the art. The performance database 745 transmits participant performance information to the incentive engine 735. Apparatus 700 includes records of participant member 750 that are transmitted for storage in the member database 755. The member information includes the participant's name, contact information and sponsor information. The member database 755 is an SQL relational database management system (RDBMS) manufactured by Oracle Corp and is well-known to those skilled in the art. The member database 755 transmits participant performance information to the incentive engine 735. Apparatus 700 includes records of incentive program parameters 760 that are transmitted for storage in the program parameters database 765. The member information includes the participant's name, contact information and sponsor information. In one embodiment well-known to those skilled in the art, the member database 765 is an SQL relational database management system (RDBMS) manufactured by Oracle Corp. The member database 765 transmits participant performance information to the incentive engine 735. The incentive engine 735 analyses the received information, and transmits to a printer 770 reports describing earned reward data that are printed 780. Furthermore, the reward data is transmitted by the incentive engine 735 to a database of reward information 785. In other embodiments not shown, reports are delivered through email, the reports are written to files in any one of a number formats well-known those skilled in the art, such as Microsoft Word .DOC format, Lotus 1-2-3 format, and text format, and transferred via FTP, diskette or transmitted to a storage device, computer display, printer, an interactive voice response system, a telephone, a voicemail system, a pager, a multimedia-enabled computer, a computer display monitor, a personal digital assistant, a personal communication system phone, or other output means well-known to those skilled in the art.

The incentive engine 735 will generate reports on participant enrollment statistics, such as:

Scheduled reports detailing the general enrollment statistics of the participants, the original entry, updates and status changes of participants and the total number of participants.

Enrollment audit trails detailing the actions resulting from entry of a participants data.

Promotion audit reports detailing set-up rules for current and future promotions.

Exception audits that detail participant transactions that exceed threshold amount designated for the transaction types.

Tax audits detailing taxable and non-taxable benefits and rewards received by participants.

Ad-hoc reports based on ad-hoc queries to the RDBMS. Ad-hoc queries are based on an understanding of individual data elements in the RDBMS and are generally referred to in the context of user defined and executed data selections to create reports. Ad-hoc reports are not pre-defined or pre-programmed.

Audits that detail the size and activity of each incentive program campaign, broken down by segments.

The incentive engine 735 will validate received data to ensure integrity of the data. For example, program data will be verified for internal consistency, participant data will be verified for consistency with program data, and goal and performance data will be verified for consistency with incentive program parameters.

Figure 8:
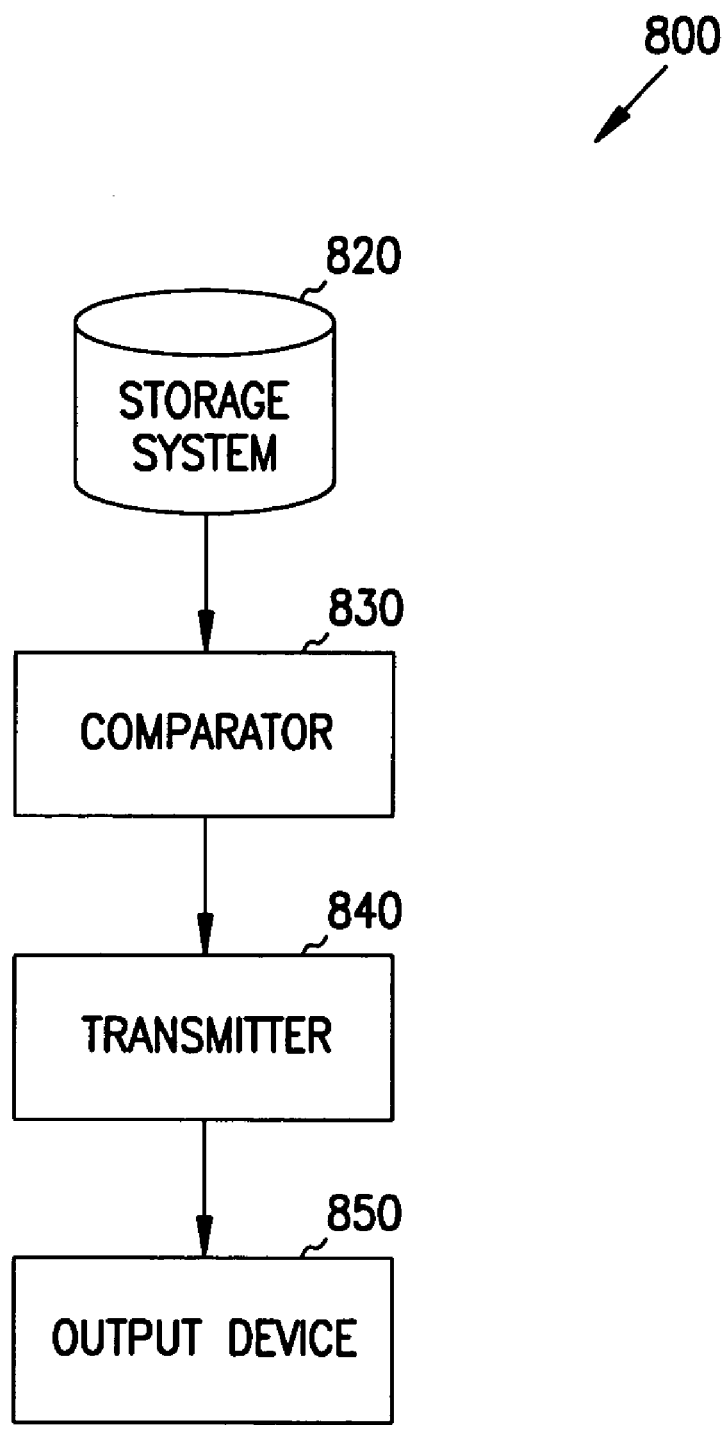
FIG. 8 is a block diagram of an apparatus according to an exemplary embodiment of the invention.

Turning now to FIG. 8, the diagram illustrates a particular implementation 800 of the system described in conjunction with FIG. 2 and the methods described in conjunction with FIGS. 3, 4, 5 and 6. System 800 is computerized incentive program system that includes a storage system for storing predetermined goal data of a participant and for storing performance data of a participant 820, a comparator component operatively coupled to the storage system for comparing the performance data to the predetermined goal data to determine if the performance data satisfies the predetermined goal data 830 and a transmitter operatively coupled to the comparator for transmitting the result of the comparison 840 to a destination output device 850. The transmitter 840 will format the data according to the features, capabilities and protocols of the output device 850. Output device 850 can be any one ore more of a mass storage device, a computer display, printer, an interactive voice response system, a telephone, a voicemail system, a pager, a multimedia-enabled computer, an email system, a computer display monitor, a personal digital assistant, and a personal communication system phone.

Apparatus 900 includes an interface providing a mechanism to enter and maintain promotion rules, participant identification, goals and performance through a keyboard display interface running on a computer 910 such as computer 110 in FIG. 1 or remote computer 150 in FIG. 1.

Figure 9:
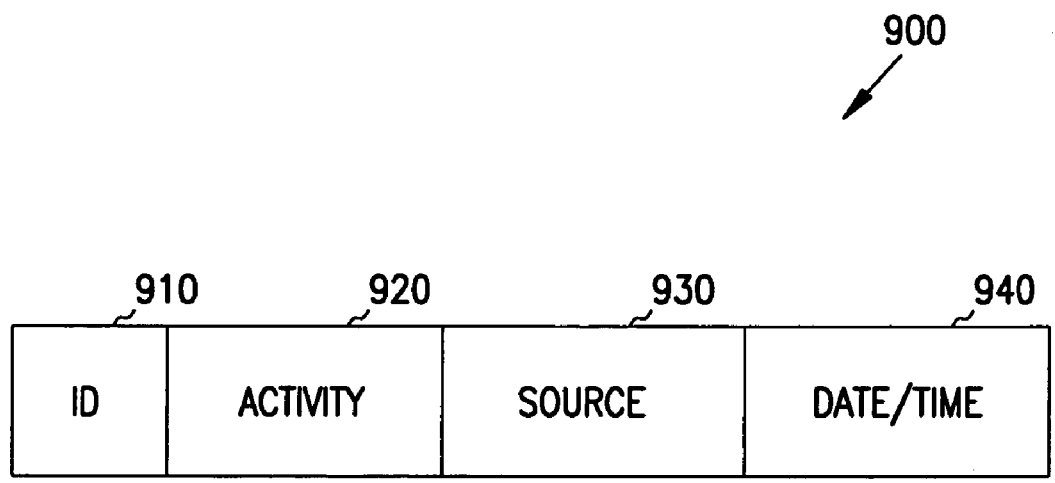
FIG. 9 is a diagram of a data structure for use in an exemplary implementation of the invention.

FIG. 9 is a diagram of an data structure for use in an exemplary implementation of the invention. Data structure 900 illustrates a transaction record. As described above, the transaction record 900 (performance results 740 in FIG. 7) is stored (block 320 in FIG. 3) in the performance database (745 in FIG. 7). The transaction record 900 includes a unique identifier of the record 910 and an activity 920, such as a sales event. The transaction record 900 also includes a source 930 that the transaction record 900 originated from, and a date/time stamp of when the transaction occurred 940. In another embodiment, the transaction record 900 includes (not shown) a field representing a quantity of the transaction, a field representing revenue value, a field representing the total number of initial and adjusted currency values that are rewarded, a field representing whether or not the transaction is taxable, and a field representing the product family that the transaction is a member of. The invention is not limited to the fields described above, and other pertinent fields can be included.

CONCLUSION

A computerized incentive system has been described. Although specific embodiments have been illustrated and described herein, it will be appreciated by those of ordinary skill in the art that any arrangement which is calculated to achieve the same purpose may be substituted for the specific embodiments shown. This application is intended to cover any adaptations or variations of the present invention. For example, a flat-file structure or an object-oriented data base structure could be implemented instead of the RDBMS described above.

The terminology used in this application with respect to a computerized incentive system is meant to include all of these environments. Therefore, it is manifestly intended that this invention be limited only by the following claims and equivalents thereof.

What is claimed is:

1. A method for providing incentive to at least one participant, such method for each participant comprising:
    (a) creating a hierarchy of participant performance levels defined by a program sponsor, including a minimum threshold level of performance and at least one successive performance level above the minimum threshold level of performance, each successive performance level defining a higher degree of achievement than the prior performance levels in such hierarchy;
    (b) associating at least one reward to the participant with achievement of each specific level of performance, such that the participant's reward for achieving each performance level above the minimum threshold level is of greater value than the reward associated with the participant achieving any of the prior performance levels;
    (c) requiring the participant to select a specific level of performance to be achieved by the participant from the hierarchy of sponsor-defined levels of performance;
    (d) determining actual performance data of the participant;
    (e) comparing the actual performance data of the participant to the selected performance level criteria, and generating a result indicating whether the participant achieved the participant's selected level of performance;
    (f) granting to the participant the reward associated with the participant's selected level of performance only if the participant achieved at least the participant-selected level of performance; and wherein the participant only receives the reward associated with the selected level of performance even if the participant achieves a higher level of performance than the selected level of performance.

2. The method of claim 1, further comprising:
    (g) modifying the sponsor-defined levels of performance using the actual performance data of the participant.

3. The method of claim 2, wherein the sponsor-defined levels of performance are heuristically modified based upon the historic performance data of the participant to enhance the effect of the incentive on the participant.

4. The method of claim 3, wherein the minimum performance level required to achieve a particular reward is increased.

5. The method of claim 1, wherein the actual performance data of the participant is quantitatively compared against the selected performance level criteria to determine whether the participant achieved the participant's selected level of performance.

6. The method of claim 1, wherein the actual performance data of the participant is qualitatively compared against the selected performance level criteria to determine whether the participant achieved the participant's selected level of performance.

7. The method of claim 1, wherein the actual performance data of the participant is tallied into a point total which is used to determine whether the participant achieved the participant's selected level of performance.

8. The method of claim 1, wherein the participant is an individual.

9. The method of claim 1, wherein the participant is a performance group of associated individuals.

10. The method of claim 1, wherein the participant is a consumer.

11. The method of claim 1, wherein the participant is an employee.

12. The method of claim 1, wherein the participant is a secondary sponsor.

13. The method of claim 1, wherein the participant performance level is a measure of sales by the participant.

14. The method of claim 1, wherein the participant performance level is a measure of safety compliance by the participant.

15. The method of claim 1, wherein the participant performance level is a measure of customer satisfaction with respect to the participant.

16. The method of claim 1, wherein the participant performance level is a measure of efficiency of the participant.

17. The method of claim 1, wherein the reward is selected from the group consisting of a written communication, verbal congratulation, numismatic funds, merchandise, certificate, and tier promotion.

18. The method of claim 1, wherein the reward is granted to the participant at the time that the participant is identified as qualifying for the reward.

19. The method of claim 1, wherein the reward is granted to the participant no earlier than a specific date.

20. The method of claim 1, wherein the selected participant level of performance requires the participant to achieve the required performance level more than once in order to qualify for the reward.

* * * * *